United States Patent
Barthel et al.

(10) Patent No.: US 6,826,433 B1
(45) Date of Patent: Nov. 30, 2004

(54) FAILSAFE DATA OUTPUT SYSTEM AND AUTOMATION SYSTEM HAVING THE SAME

(75) Inventors: Herbert Barthel, Herzogenaurach (DE); Johannes Birzer, Stulln (DE); Heiner Fuchs, Erlangen (DE); Hartmut von Krosigk, Erlangen (DE); Hartmut Schuetz, Heroldsbach (DE); Andreas Schenk, Erlangen (DE); Armin Trauth, Landau (DE); Karl Weber, Altdorf (DE); Joerg-Peter Zaech, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/600,393

(22) PCT Filed: Dec. 22, 1998

(86) PCT No.: PCT/DE98/03771
§ 371 (c)(1),
(2), (4) Date: Nov. 7, 2000

(87) PCT Pub. No.: WO99/36840
PCT Pub. Date: Jul. 22, 1999

(30) Foreign Application Priority Data

Jan. 14, 1998 (DE) ......................................... 198 01 137

(51) Int. Cl.$^7$ .............................................. G05B 9/02
(52) U.S. Cl. .............................. 700/79; 700/21; 700/80; 700/81; 700/82; 700/3; 714/2; 714/3; 714/14
(58) Field of Search ............................. 700/2.4, 19, 20, 700/21, 79, 80, 81, 82; 340/500–503, 693.12; 714/2–3, 14

(56) References Cited

U.S. PATENT DOCUMENTS

| | | | |
|---|---|---|---|
| 4,680,753 A | | 7/1987 | Fulton et al. |
| 4,761,807 A | * | 8/1988 | Matthews et al. ....... 379/88.26 |
| 4,845,594 A | * | 7/1989 | Wilkerson ................... 361/71 |
| 5,128,855 A | * | 7/1992 | Hilber et al. .................. 700/3 |
| 6,079,033 A | * | 6/2000 | Jacobson et al. ............. 714/47 |
| 6,275,881 B1 | * | 8/2001 | Doege et al. ............... 710/301 |
| 6,292,828 B1 | * | 9/2001 | Williams .................... 709/218 |

FOREIGN PATENT DOCUMENTS

| | | |
|---|---|---|
| DE | 30 24 370 | 1/1982 |
| DE | 40 41 550 | 6/1992 |
| DE | 43 12 305 | 10/1994 |
| EP | 0 524 330 | 11/1994 |
| EP | 0 770 942 | 5/1997 |
| EP | 0 837 394 | 4/1998 |

OTHER PUBLICATIONS

H. Mohlenbein, "Interbus–Dezentrale Echtzeit–Peripherie Fuer Standard–SPS–Systeme", Elektrie, vol. 44, No. 7, Jan. 1, 1990, pp. 244–249.

J. Hertel, "Absolut Sicheres Geleit Redundanzstrukturen Im Modernen Prozessleitsystem Teleperm XP", Messen Und Prufen, vol. 31, No. 10, Oct. 1, 1995, pp. 10, 12–14, 16.

* cited by examiner

*Primary Examiner*—Ramesh Patel
(74) *Attorney, Agent, or Firm*—Staas & Halsey LLP

(57) ABSTRACT

An apparatus for and a method of operating an automation system. A processing unit subjects useful information which is received via a telegram to a user designated logic operation and drives an output channel in accordance with a result of the logic operation. The processing unit monitors a time sequence of process data transmitted with the useful information and drives the output channel only when the time sequence lies within predetermined tolerances. A monitoring unit monitors the processing unit and shifts the output channel to a safe condition as soon as a malfunction of the processing unit is detected. The output channel may include a readback channel which reads back a signal applied to the output channel whereby the monitoring unit compares the applied signal and the readback signal and shifts the output channel to a safe state if the applied signal and the readback signal differ.

18 Claims, 3 Drawing Sheets

FAILSAFE DATA OUTPUT SYSTEM AND AUTOMATION SYSTEM HAVING THE SAME

FIELD OF THE INVENTION

The present invention relates to a method for operating an automation system that has at least one input unit for receiving process signals and at least one output unit for driving external peripherals, the input unit and the output unit being communicatively interconnected via a bus.

BACKGROUND INFORMATION

To achieve rapid shutdown of the automated processes or individual operations in emergency situations when working with automation projects which are controlled and/or monitored by an automation system of this type, an emergency-stop arrangement in the form of an emergency-stop chain has conventionally been provided.

Emergency-stop switches, light gratings, tread mats or the like are integrated into such an emergency-stop chain. Due to the demands to be made on an emergency-stop arrangement, it is usually designed in conventional wiring. A tunnel furnace which is subdivided into a number of segments with respect to the automation process can be mentioned here as an example. At user-accessible positions on the outside of the tunnel furnace, emergency-stop buttons, for example, are provided for the emergency-stop arrangement, the operation of an emergency-stop button entailing, for example, the defined shutting-down of the entire process depending on the design of the overall automated system.

The emergency-stop buttons are field devices having an input function. Correspondingly, the devices shutting down the process are devices having an output function for driving external peripherals, thus, for example, output devices which control a motor for transport processes, a motor for ventilation, an hydraulic unit for positioning or the like.

In the event of an emergency-stop situation, the external peripherals must be disconnected immediately. For this purpose, an emergency-stop chain which conventionally had to be constructed in conventional wiring and which, in response to the operation of an emergency-stop button, effects an immediate shutdown of the motor or an immediate shutdown of the hydraulic unit, is set up between the input devices, that is to say, the emergency-stop buttons, and the output devices such as the motors or the units. The conventional wiring has been necessary till now due to the safety demands to be made on an emergency-stop arrangement.

In this connection, however, it is disadvantageous to provide the conventional wiring in the entire process field when working with large-area automation projects such as the tunnel furnaces described.

SUMMARY

An object of the present invention is to provide a method for operating an automation system in which it is possible to dispense with the conventional wiring for dealing with emergency-stop situations, and instead a communicative connection exists between the components of the emergency-stop chain via the bus of the automation system.

According to the present invention, therefore, the conventional wiring for the emergency-stop arrangement is omitted, and all field devices, i.e., thus also the emergency-stop buttons and the motors or units to be integrated into the emergency-stop chain, are communicatively connected via the process bus.

This objective is achieved for a method for operating an automation system, wherein the automation system has at least one input unit for receiving process signals and at least one output unit for driving external peripherals, and wherein the at least one input unit and the at least one output unit are communicatively interconnected via a bus, in that at least one of the input units and at least one of the output units are constructed as a failsafe input unit and as a failsafe output unit, respectively. The failsafe input unit transmits a data item to the failsafe output unit at predetermined times, that the data item includes at least one useful information item, one destination point code designating the addressed output unit and one origin code designating the transmitting input unit. The output unit interprets the continuous reception of the data item as an indication of an intact communication relationship, and otherwise shifts the connected peripherals into a safe state.

According to the present invention, the safety demands to be made on an emergency-stop arrangement are met if the input devices, i.e., for example, the emergency-stop buttons and the output devices that are to be integrated into the emergency-stop chain and are provided for driving the motors or units, are in each case constructed to be failsafe. In the event of an emergency-stop situation, the following sequence then occurs in the automated system:

In response to the operation of an emergency-stop button, a data item is placed on the bus by the data input device. According to the specifications of the bus protocol used for the physical communications link, the data item to be transmitted includes at least one useful information item, in this case therefore the information as to whether the emergency-stop button has been pressed or not, at least one destination address, i.e., the address of the communication partner to which the message is sent—a special identifier enabling the message to be sent to all communication partners —and, finally, the origin code which identifies the sender of the data item.

The present invention can then be used, on the one hand, in such a manner that the data item is sent to a quite specific communication partner, the addressee recognizing from the destination address contained in the data item that the data item is intended for it, or the data item is sent to all communication partners, each individual communication partner determining from the origin address of the data item whether the data item, i.e., the useful information in the data item, is to be evaluated by it.

On the other hand, the data item can also be sent to a higher-level unit of the automation system, e.g. the central processing unit of a programmable controller, the latter in turn recognizing from the origin code of the data item that a message, e.g., from an emergency-stop button, has arrived which needs immediate handling, so that immediately after detecting the data item, the central processing unit forwards it to the output devices so that they trigger a deceleration or shutdown of the motors or units connected to the output devices, or they themselves transmit a further data item to the output devices which leads to the same result.

In this context, the output unit interprets the continuous reception of the data item from the input unit as indication of an intact communication relationship. In the case when the output unit detects that a data item from an input unit fails to appear during a time span which is greater than a predeterminable time span, the output unit shifts the connected peripherals into a safe state and thus ensures again that the connected motors or units are shut down.

For use within the framework of the method according to the present invention for operating an automation system, provision is also made for a failsafe data input device having at least one input channel for connecting peripheral sensors, the data input device being provided with a test circuit which triggers a test procedure at predetermined times and, in so doing, effects a status change for at least one of the input channels of the failsafe input device, an internal logic monitoring the status change and, if necessary, outputting an error message, the status change effected by the test circuit being canceled again at the end of the test procedure, and the test procedure being completely transparent for reading out the affected input channel.

Furthermore or as an alternative, a failsafe data input device having at least one input channel for connecting peripheral sensors, in which the at least one input channel is designed to be antivalent, is provided for use within the framework of the method according to the invention for operating an automation system.

Due to the above-mentioned measures, i.e. due to the antivalent design of the input channel or due to the monitoring of the input channel by a test circuit, the failsafe input devices designed in accordance with the above description become failsafe data input devices, it also being possible to combine the two measures.

Furthermore, an output unit constructed as a failsafe output device is provided for use within the framework of the method according to the present invention for operating an automation system. If a processing unit for processing user-designable logic operations is provided for the failsafe data output device, where the processing unit evaluates the useful information of a received data item, subjects the useful information to the user-designable logic operation and drives the at least one output channel in accordance with the result of the logic operation, software components which were previously usually provided in a higher-level automation device, e.g., the central processing unit of a programmable controller, are also displaceable into the failsafe output device, so that in this case especially fast and effective processing and evaluation of the logic operations is possible.

If for the failsafe data output device, the processing unit furthermore or alternatively monitors the time sequence of the process data transmitted with the useful information and drives the at least one output channel only if the time sequence of the data required for driving the output channel lies within predeterminable tolerances, then a so-called muting is possible which contributes to increasing the reliability of the automated process. The protection of a traverser with the aid of an inductive limit switch and a light barrier can be named as an example. When the traverser moves, it triggers both the inductive limit switch and the light barrier in a certain time sequence determined by the speed of the traverser.

When the time sequence of the input of the associated signals is within the predetermined tolerances, the processing can be continued. On the other hand, a person only triggers the light barrier when the additional signal of the inductive limit switch is absent during the predetermined tolerance time. Such a constellation can be evaluated as an alarm constellation, to which reaction is possible with an emergency-stop arrangement.

If the failsafe data output device is provided with a monitoring circuit, constructed as watchdog and monitoring the processing unit, which shifts the at least one output channel into a safe state as soon as a malfunction of the processing unit is detected, then a second disconnect path is established via the monitoring circuit constructed as watchdog. If, for example, the processing unit were no longer capable of disconnecting a special output, then a motor or a unit, for example, would remain permanently activated without the monitoring circuit. The monitoring circuit constructed as watchdog detects such states and, upon detecting, switches the outputs into a safe state.

If, in the failsafe data output device, the output channel, which can be driven by the processing unit, is constructed as a readback output channel, if the signal which can be supplied to the output channel can also be supplied to the monitoring circuit, and if the monitoring circuit compares the signal supplied to it and the signal read back from the output channel and, in response to deviations, shifts the affected output channel or even all the output channels and the peripherals connected thereto into a safe state, then discrepancies in the driving of the respective output channels are detected and they are immediately shifted into a safe state.

DETAILED DESCRIPTION

Figure 1:
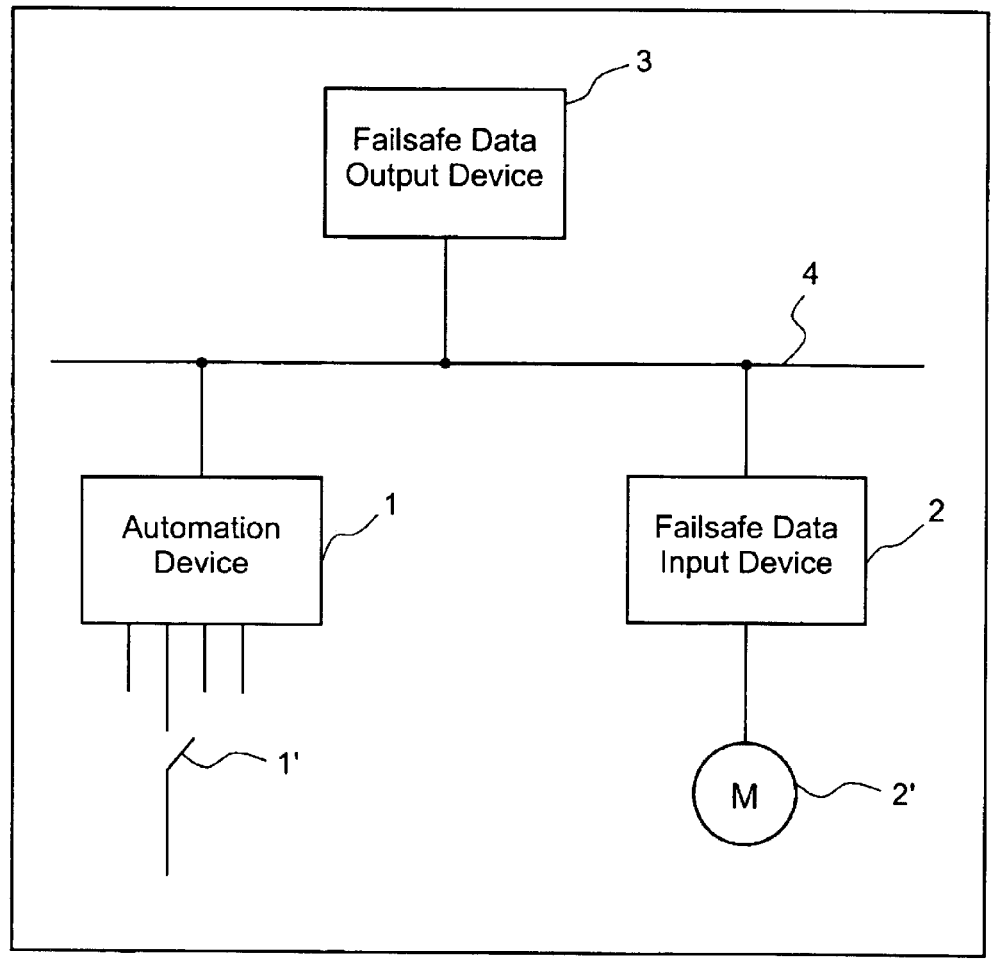
FIG. 1 shows a simplified block diagram of an automation system 1.

In FIG. 1, a block diagram of a simple automation system having a failsafe data input device 2, a failsafe data output device 3 and a higher-level automation device 1, e.g., central processing unit 1 of a programmable controller, is shown by way of example. The devices are communicatively interconnected via a bus 4, preferably via a bus 4 suitable for use in industrial environments, especially the profi process field bus 4.

Failsafe data input device 2 is connected to an emergency-stop button 1'. Failsafe data output device 3 is connected to a motor 2'. When emergency-stop button 1' is operated, data input device 2 receives this signal, transmits it via bus 4 to data output device 3 which thereupon effects the shutdown of motor 2'.

Figure 2:
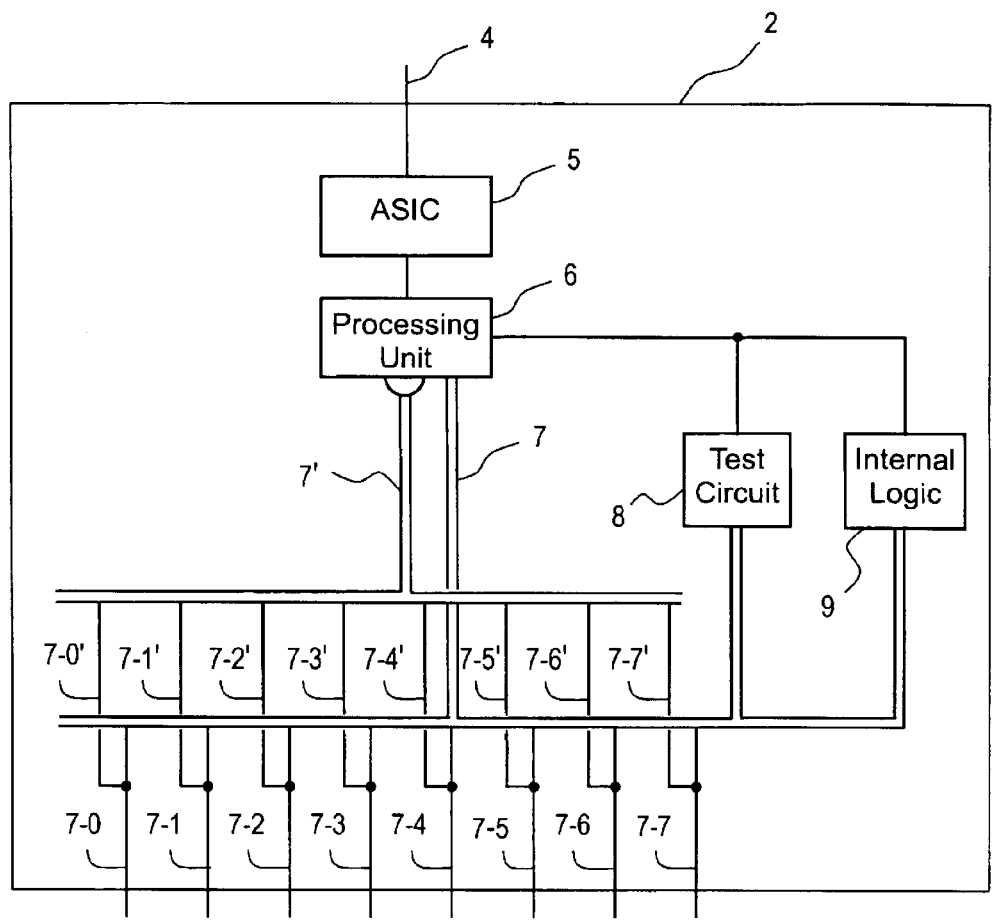
FIG. 2 shows a block diagram of a failsafe data input device 1.

FIG. 2 shows a block diagram of a first embodiment of a failsafe data input device 2. Failsafe data input device 2 is communicatively connected via bus 4 to other devices 1, 2, 3 linked to bus 4, the bus interface being effected by a bus ASIC 5. The functions of data output device 3 are effected by a processing unit 6 which, for example, is an ASIC or a microprocessor. Input channels 7-0, 7-1 . . . 7—7 are supplied directly or indirectly to processing unit 6.

Also provided in data input device 2 is a test circuit 8 which is likewise controlled by processing unit 6 and which triggers a test procedure at predetermined times and, in so doing, effects a status change for at least one of input channels 7-0, 7-1 . . . 7—7 of failsafe data input device 2. This status change is monitored by an internal logic 9 which outputs an error message if the status change triggered by test circuit 8 has no effect on the status of the respective input channel 7-0, 7-1 . . . 7—7. At the end of the test procedure, the status change effected by test circuit 8 is canceled again. In this context, the test procedure is completely transparent for reading out the affected input channels 7-0, 7-1 . . . 7—7 during normal operation of failsafe data input device 2.

Furthermore, if inputs 7-0, 7-1 . . . 7—7 are also supplied in negated form 7-0', 7-1'. . . 7—7' to processing unit 6, the input channels are designed to be antivalent. Processing unit 6 then reads the status, e.g. logical 0, for the input channel in question, e.g. 7-2, and as negated status for antivalent corresponding input 7-2', the corresponding complement, thus logical 1 in this case. Malfunctions during the forwarding of the statuses of the respective input channels can then be detected simply and reliably by processing unit 6 by checking in each case whether complementary statuses are present on the respective input channel and on the input channel antivalent thereto.

Figure 3:
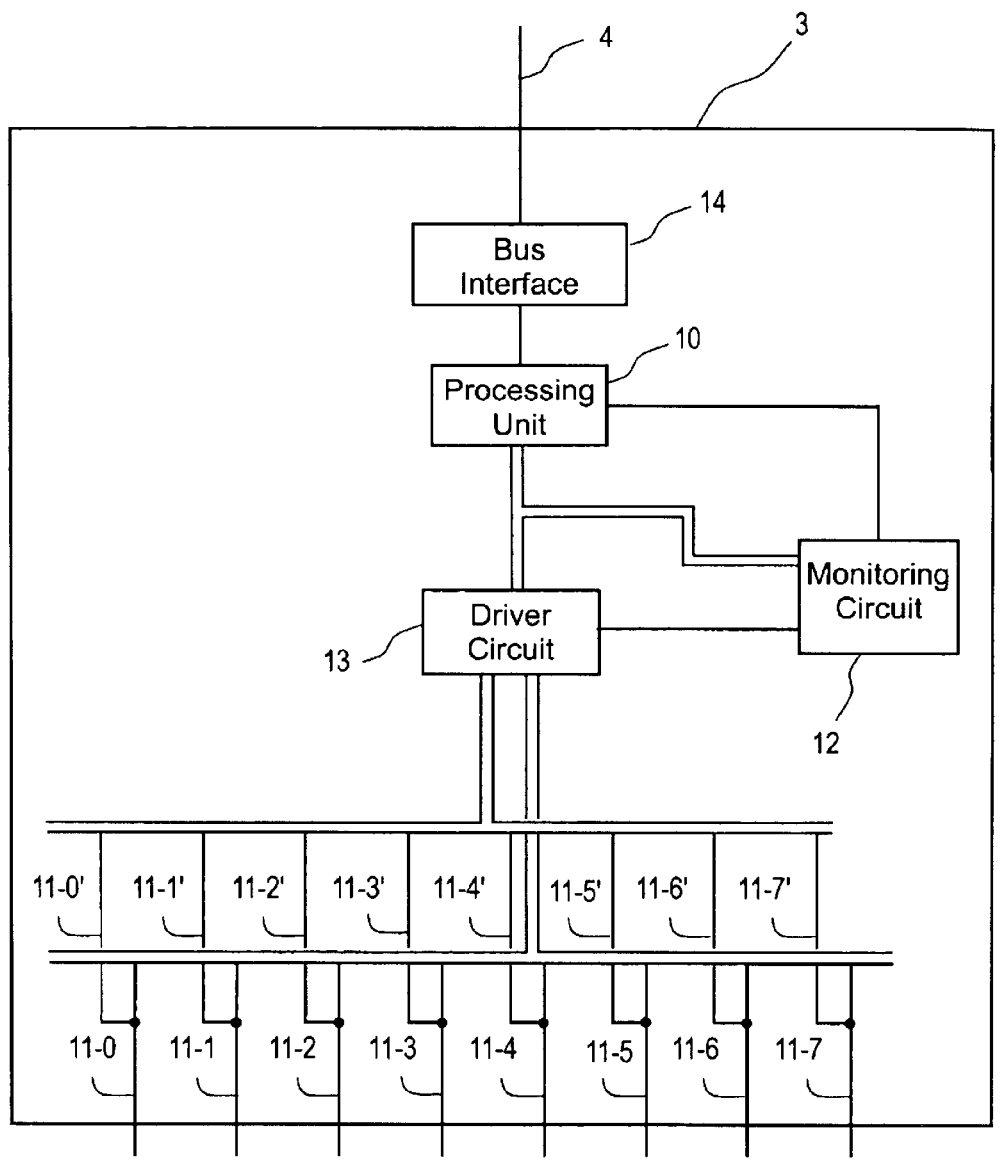
FIG. 3 shows a block diagram of a failsafe data output device.

FIG. 3 shows a block diagram of a failsafe data output device 3 which is connected to process bus 4 by a bus ASIC 14 constructed as bus interface 14. Failsafe data output device 3 has a processing unit 10 for processing user-designable logic operations, processing unit 10 evaluating useful information TN of a message received via process bus 4, subjecting useful information TN to the user-designable logic operation and driving the at least one output channel 11-0, 11-1 . . . 11-7 in accordance with the result of the logic operation.

In the illustration according to FIG. 3, failsafe data output device 3 has a monitoring circuit 12 constructed as watchdog 12 and monitoring processing unit 10, said monitoring circuit shifting the at least one output channel 11-0, 11-1 . . . 11-7 into a safe state as soon as a malfunction of processing unit 10 is detected. For this purpose, monitoring circuit 12 monitors the functioning of processing unit 10, the statuses of the respective output channels 11-0, 11-1 . . . 11-7 being determined by monitoring circuit 12 in the event processing unit 10 malfunctions, for which purpose a driver circuit 13 is provided which can be driven both by processing unit 10 and by monitoring circuit 12.

If processing unit 10 malfunctions, the driving, output by monitoring circuit 12, of the respective output channels 11-0, 11-1 . . . 11-7 overwrites the respective driving by processing unit 10 which has already been detected as faulty at this time.

In the illustration according to FIG. 3, failsafe data output device 3 is also constructed in such a manner that output channel 11-0, 11-1 . . . 11-7, which can be driven by the processing unit, is constructed as readback output channel 11-0', 11-1'. . . 11-7', that the signal which can be supplied to output channel 11-0, 11-1 . . . 11-7 can also be supplied to monitoring circuit 12, that monitoring circuit 12 compares the signal supplied to it and signal 11-0', 11-1'. . . 11-7' read back from the output channel and, in response to deviations, shifts the affected output channel 11-0, 11-1 . . . 11-7 into a safe state.

In the above description, the assumption is always input and output devices 2, 3 having in each case eight input and output channels, respectively. Naturally, the number of channels can also be greater or less than eight, e.g., 16 or 32.

What is claimed is:

1. A method of operating an automation system having at least one input unit for receiving process signals and at least one output unit for driving external peripherals which are communicatively interconnected via a bus, wherein at least one of the at least one input units is constructed as a failsafe input unit and at least one of the at least one output units is constructed as a failsafe output unit, the method comprising:

transmitting a telegram from the at least one failsafe input unit to the at least one failsafe output unit at predetermined times, the telegram including at least one useful information item, one destination code point designating an address for one of the at least one failsafe output units and one origin code designating the failsafe input unit transmitting the telegram;

interpreting receipt of the telegram at the predetermined times as an indication of an intact communications relationship; and shifting the connected peripherals into a safe state if the telegram is not received at the predetermined times.

2. The method as recited in claim 1, further comprising:

triggering a test procedure at predetermined times;

effecting a status change for at least one input channel of at least one of the at least one failsafe input units;

monitoring the status change;

outputting an error message, if necessary; and canceling the effected status change at an end of the test procedure, the test procedure being completely transparent for reading out the at least one input channel.

3. The method as recited in claim 2, further comprising:

operating the at least one input channel as an antivalent channel.

4. The method as recited in claim 3, further comprising:

providing a monitoring circuit which operates as a watchdog; and shifting the at least one output channel into a safe state as soon as the monitoring circuit detects a malfunction of the automation system.

5. The method as recited in claim 4, further comprising:

reading back a signal supplied to the output channel;

comparing the signal supplied to the output channel and the signal read back from the output channel; and shifting at least one of output channel to a safe state in response to a deviation detected by the comparison.

6. The method as recited in claim 2, further comprising:

evaluating the at least one useful information item of the telegram;

subjecting the at least one useful information item to a user designated logic operation; and driving the at least one output channel in accordance with a result of the designated logic operation.

7. The method as recited in claim 6, further comprising:

monitoring a time sequence of the process data which is transmitted with the useful information; and driving the at least one output channel only when the time sequence of the data required for driving the at least one output channel lies within predetermined tolerances.

8. The method as recited in claim 6, further comprising:

providing a monitoring circuit which operates as a watchdog; and shifting the at least one output channel into a safe state as soon as the monitoring circuit detects a malfunction of the automation system.

9. The method as recited in claim 8, further comprising:

reading back a signal supplied to the output channel;

comparing the signal supplied to the output channel with the signal read back from the output channel; and shifting at least one output channel to a safe state in response to a deviation detected by the comparison.

10. An automation system, comprising:

at least one input unit which receives process signals; and at least one output unit for driving external peripherals, the at least one input unit and the at least one output unit being communicatively interconnected via a bus, wherein at least one of the at least one input units is constructed as a failsafe input unit and at least one of the at least one output units is constructed as a failsafe output unit, wherein:

the at least one failsafe input unit transmits a telegram to the at least one failsafe output unit at predetermined times, the telegram including at least one useful information item, one destination code point designating an address for one of the at least one failsafe output units and one origin code designating the failsafe input unit transmitting the telegram; and the at least one failsafe output unit interprets receipt of the telegram at the predetermined times as an indication of an intact communications relationship, otherwise the automation system shifts the connected peripherals into a safe state.

11. The automation system as recited in claim 10, further comprising:

a test circuit which triggers a test procedure at predetermined times and effects a status change for at least one input channel of at least one of the at least one failsafe input units; and an internal logic circuit which monitors the status change and outputs an error message, if necessary and cancels the effected status change at an end of the test procedure, wherein the test procedure is completely transparent for reading out the at least one input channel.

12. The automation system as recited in claim 10, wherein the at least one failsafe input device comprises at least one input channel which operates as an antivalent channel.

13. The automation system as recited in claim 12, further comprising:

a processing unit which:
evaluates the at least one useful information item of the telegram;
subjects the at least one useful information item to a user designated logic operation; and
drives the at least one output channel in accordance with a result of the designated logic operation.

14. The automation system as recited in claim 13, further comprising:

a watchdog which monitors the processing unit and shifts the at least one output channel into a safe state as soon as the watchdog detects a malfunction of the automation system.

15. The automation system as recited in claim 14, wherein:

the output channel is constructed as a readback output channel;

a signal supplied to the output channel is also supplied to the watchdog; and the watchdog compares the signal supplied to the output channel and a signal read back from the output channel shifts at least one output channel to a safe state in response to a deviation detected by the comparison.

16. The automation system as recited in claim 10, wherein the processing unit:

monitors a time sequence of process data transmitted with the useful information; and drives the at least one output channel only when the time sequence of the data required for driving the at least one output channel lies within predetermined tolerances.

17. The automation system as recited in claim 16, further comprising:

a watchdog which monitors the processing unit and shifts the at least one output channel into a safe state as soon as the watchdog detects a malfunction of the automation system.

18. The automation system as recited in claim 17, wherein:

the output channel is constructed as a readback output channel;

a signal supplied to the output channel is also supplied to the watchdog; and the watchdog compares the signal supplied to the output channel and a signal read back from the output channel shifts at least one output channel to a safe state in response to a deviation detected by the comparison.

* * * * *